(12) United States Patent
Ozdas et al.

(10) Patent No.: US 7,565,285 B2
(45) Date of Patent: *Jul. 21, 2009

(54) DETECTING NEAR-TERM SUICIDAL RISK UTILIZING VOCAL JITTER

(75) Inventors: Asli Ozdas, Brentwood, TN (US); Marilyn K. Silverman, 186 Old Ridgefield Rd., Wilton, CT (US) 06897; Stephen E. Silverman, Wilton, CT (US); Marilyn K. Silverman, legal representative, 186 Old Ridgefield Rd., Weston, CT (US) 06897

(73) Assignees: Marilyn K. Silverman, Wilton, CT (US); Vanderbilt University, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/600,312

(22) Filed: Nov. 14, 2006

(65) Prior Publication Data

US 2007/0233468 A1 Oct. 4, 2007

Related U.S. Application Data

(63) Continuation of application No. 09/971,777, filed on Oct. 5, 2001, now Pat. No. 7,139,699.

(60) Provisional application No. 60/238,351, filed on Oct. 6, 2000.

(51) Int. Cl.
*G10L 19/14* (2006.01)
(52) U.S. Cl. .................................... 704/211
(58) Field of Classification Search ................ 704/211, 704/236, 266
See application file for complete search history.

(56) References Cited

U.S. PATENT DOCUMENTS

| | | | |
|---|---|---|---|
| 3,278,685 A | 10/1966 | Harper | 179/1 |
| 3,855,416 A | 12/1974 | Fuller | 179/1 SA |
| 3,855,417 A | 12/1974 | Fuller | 179/1 SA |
| 3,855,418 A | 12/1974 | Fuller | 179/1 SA |
| 3,971,034 A | 7/1976 | Bell, Jr. et al. | 346/1 |
| 4,093,821 A | 6/1978 | Williamson | 179/1 SC |
| 4,139,732 A | 2/1979 | Fourcin | 179/1 AL |
| 4,142,067 A | 2/1979 | Williamson | 179/1 SC |
| 4,675,904 A | 6/1987 | Silverman | 381/41 |
| 5,148,483 A | 9/1992 | Silverman | 381/41 |
| 5,976,081 A | 11/1999 | Silverman | 600/300 |
| 6,353,810 B1 | 3/2002 | Petrushin | 704/236 |
| 6,934,461 B1 | 8/2005 | Strub et al. | 386/46 |

OTHER PUBLICATIONS

Shubha et al., "Application of the Wavelet Transform for Pitch Detection of Speech Signals," IEEE Transactions On Information Theory, vol. 38, No. 2, Mar. 1992, pp. 917-921.

Thomas Parsons, "Voice and Speech Processing," 197-207, McGraw-Hill (19870.

(Continued)

*Primary Examiner*—Michael N Opsasnick
(74) *Attorney, Agent, or Firm*—Charles N. Quinn, Esq.; Fox Rothschild LLP (57) ABSTRACT

Method and apparatus to measure jitter (period-to-period fluctuations in fundamental frequency) among the voices of suicidal, major depressed, and non-suicidal patients to predict near-term suicidal risk.

5 Claims, 4 Drawing Sheets

OTHER PUBLICATIONS

France et al., "Acoustical Properties of Speech as Indicators of Depression and Suicidal Risk," IEEE Transactions on Biomedical Engineering, vol. 47, Jul. 2000, pp. 829-837.

John Markel, "The SIFT Algorithm for Fundamental Frequency Estimations," IEEE Transactions on Audio and Electronics, Col. AU-20, No. 5, Dec. 1972, pp. 367-377.

Zhou et al., Nonlinear Feature Based Classification of Speech Under Stress, IEEE Transactions on Speech and Audio Processing, vol. 9, No. 3, Mar. 2001, pp. 201-216.

Fukuda et al., "Extracting Emotion From Voice," Systems, Man, and Cybernetics, IEEE SMC '99 Conference Proceedings. 1999 IEEE International Conference on, vol. 4, Oct. 12-15, 1999, pp. 299-304.

Janer et al, "Pitch detection and voiced/unvoiced decision algorithm based on wavelet transforms," Spoken language, 1996. ICSLP 96. Proceedings., Fourth International Conference on, vol. 2, Oct. 3-6, 19996, pp. 1209-1212.

Flanagan, J.L., Speech Analysis Synthesis and Perception, published by Academic Press, Inc., New York (1965) (pages attached: cover page, table of contents, pp. 51-54, 141-145.

Rowden, C., ed., Speech Processing, published by McGraw-Hill Book Company, London (1992) (pages attached: cover page, table of contents, pp. 10-21).

Scherer, Klaus R., Vocal Affect Expression: A Review and a Model for Future Research. Psychological Bulletin, 9:143-165 (1986).

Stassen, H.H., Affective State and Voice: The Specific Properties of Overtone Distributions. Methods of Information in Medicine (1991).

Bourne-Ekstrand, Psychology Its Principles and Meanings. CBS College Publishing, pp. 6-13, 436 (1985).

Rabiner, L.R. and Schafer, R.W., Digital Processing of Speech Signals. Prentice Hall, pp. 38-60 (1978).

Studies of Suicide and Suicidal Behavior, National Institute of Mental Health, pp. 1-10 (1995).

Elman, J.L., Effects of frequency-shifted feedback on the pitch of vocal productions. J. Acoust. Soc. Am: 70:45-50 (Jul. 1981).

France, D.J. et al., Acoustical Properties of Speech as Indicators of Depression and Suicidal Ris. IEEE Transactions on Biomedical Engineering 47:829-837 (Jul. 2000).

"Identifying Even the Most Subtle Cries for Help", Engineering News, Vanderbilt University School of Engineering, 3 pages (undated).

6 page two-sized brochure entitled "MicroSound™: redefining the quality and flexibility of audio peripherals" of Micro Technology Unlimited (undated).

42 page two-sided User & Installation Manual for Microsound—AT on IBM PC/AT & Compatible Computers of MicroTechnology Unlimited (Dec. 1, 1989).

Graf, R.F., Modern Dictionary of Electronics, p. 32.

DETECTING NEAR-TERM SUICIDAL RISK UTILIZING VOCAL JITTER

CROSS-REFERENCE TO RELATED PATENT APPLICATION

This application is a continuation application of and claims priority under 35 U.S.C. § 120 of application Ser. No. 09/971,777, now U.S. Pat. No. 7,139,699, filed Oct. 5, 2001, which in turn claims the benefit of the priority under 35 U.S.C. § 119 and 120 of U.S. provisional application Ser. No. 60/238,351 entitled "Analysis of Vocal Jitter For Near-Term Suicidal Risk Assessment" filed 6 Oct. 2000 in the names of Dr. Stephen E. Silverman, Dr. Marilyn K. Silverman and Asli Ozdas.

BACKGROUND OF THE INVENTION

Among the many clinical decisions psychiatrists must make, assessment of a patient's risk of committing suicide is definitely among the most complex and demanding; identification of individuals at imminent suicidal risk is the most important decision a clinician makes. Currently, such assessment is done on a clinical intuitive level, which requires gathering and weighing a variety of information and data from numerous sources. These data include the patient's demographic profile, history, family evaluation and psychological factors, as well as the current situation as evaluated during the clinical interview. These data help in categorizing groups of people as "high risk" but they are not useful to determine if a patient is at imminent risk. Moreover, collecting such data is time consuming; required data to make a decision are usually not available in clinical situations requiring an immediate decision.

DESCRIPTION OF THE PRIOR ART

There are no widely-accepted, objective diagnostic tools and instruments to supplement clinical judgment through quantitative determination of the imminence of suicidal risk. This is partly due to the fact that most of the factors (age, health, race, etc.) associated with near-term risk cannot be generalized to a large population. Biochemically-based detection schemes have also been investigated; results indicate that more research is necessary before their implementation; see B. Bongar, *Suicide: Guidelines for Assessment, Management and Treatment*, Oxford University Press, New York, 1990 and M. Asberg, "Neurotransmitters and Suicidal Behavior—The Evidence from Cerebrospinal Fluid Studies", *Annals of New York Academic Sciences*, vol. 836 pages 158-181, 1997.

In clinical situations, predictions of suicidal predisposition are often based on the patient's voice. One of the instant inventors has discovered that the voices of suicidally predisposed patients exhibit unique quantitatively, identifiable and measurable qualities, which distinguish those patients from non-suicidally predisposed patients; see U.S. Pat. Nos. 4,675,904; 5,148,483 and 5,976,081 the disclosures of which are incorporated by reference.

The human voice contains significant information about the physiologically-mediated emotional state of the speaker at a nonverbal level. Clinicians use such information in diagnosing syndromes presumably underlying a person's abnormal behavior or emotional state; see K. Scherer, "Nonlinguistic Vocal Indicators of Emotion and Psychopathology", *Emotions in Personality and Psychopathology*, Picnum Press, New York, pp. 493-526, 1979.

There is evidence that emotional arousal produces changes in the speech production scheme by affecting the respiratory, phonatory, and articulatory processes encoded in the acoustic signal; see K. R. Scherer, "Vocal Correlates of Emotional Arousal and Affective Disturbance", *Handbook of Social Psychophysiology*, pp. 165-197, New York, 1989. This is largely due to the fact that vocalization reflects many different aspects of functioning of neurophysiological structures. The neocortex controls speech production through specific motor commands producing appropriate phonatory and articulatory movements. Due to underlying neuroregulatory and neurochemical disturbances resulting from a wide variety of complex emotions, affective disturbances in psychopathology have strong effects on a patient's voice and speech.

Speech changes associated with depression have long been recognized. Fundamental frequency is a widely studied feature in speech and psychopathology research. Most studies to date have investigated long-term variability or long-term averages of fundamental frequency. Although these parameters exhibit differences between pathological and normal subjects over a course of treatment, the overall picture as generally reported heretofore is inconsistent. There have been findings of both increased and decreased mean fundamental frequency and fundamental frequency variability in depressed persons' speech in comparison to that of control group subjects. Such discrepancies and disparities may be due to lack of homogeneity in patient populations, differences in measurement methodologies or symptomatology of the investigated subjects.

Agitated forms of depressive symptomatology are generally considered to exhibit significant levels of anxiety leading to an increase in fundamental frequency variation, whereas patients with retarded forms of depression exhibit the opposite; see J. K. Darby "Speech and Voice Studies in Psychiatric Populations", *Speech Evaluation in Psychiatry*, pp. 39-51, Grune & Stratton, Inc., New York, 1981. These inconsistent results may also be linked to different coping styles associated with subjects.

A study towards the goal of determining through acoustic analysis whether a patient is at imminent suicidal risk was conducted by Campbell and reported in a masters thesis at Vanderbilt University in 1995. Investigation of subjects as their own control, based on long-term variation of their fundamental frequency patterns, yielded 77% correlation between near-term suicidal and remission states. In a later study conducted at Vanderbilt in 1997, long-term fundamental frequency statistics (mean, variance, skewness and kurtosis) and fundamental frequency range were investigated; fundamental frequency range was verified as significant for identification of near-term suicidal risk.

Although these findings are very important and promising, they don't provide any information about fine temporal structure of fundamental frequency data.

A more fine-grained feature, "jitter", addresses short-term perturbations that are typically washed out by long-term analyses. Jitter is a good indicator of stressor-provoked anxiety; "Validity and Reliability of Nonverbal Voice Measures as Indicators of Stressor-Provoked Anxiety", *Research Nurses Health*, volume 15, 1992. Jitter does not differ across coping styles, suggesting that jitter may be a very useful clinical indicator.

Jitter is very physiologically-driven. This is inevitable, given the nature of phonation. The human phonatory system is not a perfect machine and period-to-period fluctuations of fundamental frequency are always present, even in normal speech. However, these fluctuations are more erratic for pathological voices such as functional voice disorders and pathologic larynges. Also, according to Scherer, vocal fold vibrations become more irregular (resulting in higher jitter) with higher laryngeal tension caused by emotional stress. Among some emotional modes (anxiety, fear, and anger) jitter values differ.

Authorities differ as to the reliability of empirical jitter as an emotional indicator of high near term suicidal risk, even though jitter has been investigated for use as an indicator of depressed speech; see Lieberman and Michaels, "Some Aspects of Fundamental Frequency and Envelope Amplitude as Related to the Emotional Content of Speech", *Journal of the Acoustic Society of America*, volume 32, pp. 922-927, 1962 and Williams and Stevens, "Emotions and Speech: Some Acoustical Correlates", *Journal of the Acoustic Society of America*, volume 52, pp. 1238-1250, 1972.

SUMMARY OF THE INVENTION

This invention relates to utility and significance of jitter, which is a measure of period-to-period fluctuation in fundamental frequency of a patient's voice, as an indicator of near-term suicidal risk.

In the invention a method for assessment of near-term suicidal risk comprises sampling a patient's voice, analyzing the sampled voice data, and determining whether data from the patient's sampled voice meet specific jitter criteria for near-term suicidal risk.

The invention further provides a method for assessment of near-term suicidal risk wherein the sampling step comprises obtaining an analog or digital recording and optionally editing the recorded sample to remove periods of extended silence to result in a sample of continuous speech.

A further aspect of the invention is a method for assessing near-term suicidal risk wherein the jitter analyzing step comprises performing acoustic analyses including fundamental frequency determination, classifying the voice data signal into voiced, unvoiced and silence segments, estimating the glottal cycle duration if at least one of two consecutive segments is classified as voiced, and measuring period-to-period fluctuation in fundamental frequency as jitter.

The invention also embraces a method for assessment of near-term suicidal risk where the determination step further comprises comparing the collected and analyzed data to data from a database where the database desirably includes periodically updated sample voice data from near-term suicidal risk patients, depressed and nondepressed patients.

Also in accordance with the invention is a method for assessment of near-term suicidal risk assessment in a clinical environment. The method may include clinically evaluating a patient, determining that the patient may be depressed, sampling the patient's voice, performing acoustic analysis to determine the period-to-period fluctuation in fundamental frequency, namely presence and amount of jitter in the patient's sampled voice, using the period-to-period fluctuation in the fundamental frequency data to compare the patient's voice analysis to a database of sampled voice data and using the database comparison in conjunction with the clinical assessment to determine whether the patient is at near-term risk for suicide.

In an additional one of its aspects this invention provides a method for assessing near-term suicidal risk through voice analysis independently of verbal content of the voice where the method includes the steps of eliciting a voice sample from a person to be evaluated for near-term suicidal risk and converting the sample into electronically processable signal form. The method further embraces time-wise dividing the signal into segments according to whether the person was silent, speaking voiced words or making unintelligible unvoiced sounds. The method proceeds by inquiring as to whether there are two consecutive voiced segments and, if so, measuring the fundamental frequency of each of the two segments. The method then proceeds by computing the difference in measured fundamental frequency for the two segments and then compares the difference in measured fundamental frequency to fundamental frequency difference data for known near-term suicidal risk persons, known depressed persons not at near-term suicidal risk and non-depressed persons from a control group, to determine whether the person is at near-term suicidal risk or is merely depressed.

In yet another of its aspects this invention provides a method for determining jitter variations in fundamental frequency of the voice of a person being evaluated for near-term suicidal risk where the method desirably commences with the setting up of an analysis window to a selected sample set length, most desirably 512 sets in length. The method preferably proceeds with computing a wavelet transform for the sample set at a scale set at $2^4$ with a scale factor preferably defined by the quotient of the wavelet center frequency at level zero and a desired center frequency. The method preferably further proceeds by selecting two consecutive segments of the vocal signal of such person which are voiced segments and generating two separate pulse trains in which the heights of the pulses preferably correspond to the amplitude of positive and negative peaks of the wavelet transformed speech signal. The method preferably then proceeds with thresholding the segments of the vocal signals to discard peaks corresponding to possible unvoiced samples.

The method preferably still further proceeds with computing fundamental frequency over the entirety of each of the two segments preferably by finding the location of the first peak of the autocorrelation of the smooth spectrum to the right of the zero lag component, detecting a starting pulse exhibiting the property of being larger than both the pulse immediately preceding and immediately following such starting pulse and being greater than fifty percent (50%) of the global maximum of the pulse sequence, locating following prominent pulses as detected in the neighborhood of expected locations determined by the peak of the autocorrelation sequence, selecting between two (2) sequences of positive and negative peaks with one of the peaks having a largest absolute sum of peak magnitude and taking the difference between two consecutive prominent pulses as the duration for the glottal cycle. The method then proceeds to determine period-to-period fluctuation of fundamental frequency as the inverse of the glottal cycle for the two consecutive pulses identified as being prominent.

In yet another of its aspects, this invention provides a method for categorizing voice samples of persons being tested for near-term suicidal risk as a prelude to such testing where the method preferably begins with setting an analysis window to a selected sample set length, desirably 512 sets, and identifying a particular sample arbitrarily as the Kth sample. The method proceeds by reading the Kth sample preferably as an electronic signal and then proceeds preferably by computing wavelet transforms of the Kth sample for scales and powers of two running from the first power to the fifth. The method further preferably proceeds by storing the signal energy value as computed for each such scale and checking to determine whether the Kth sample is the last of the sample set. If additional samples remain, the method proceeds to read the additional samples, computing the wavelet transforms for the samples for the same scales and storing the signal energy values as computed for each such scale. The method then proceeds to set the immediate energy distribution for one of the scales as a threshold, desirably at the scale for $2^4$. The method then proceeds successively for each sample to compare the energy across the scales and if maximum energy is at the first scale for $2^4$, identifying the segment as unvoiced and proceeding to the next succeeding sample. The method further preferably proceeds, if the maximum segment energy is at one of the scales of $2^2$ through $2^5$, by identifying the segment as being either voiced or silent. The method then concludes by determining if the segment energy at the $2^4$ scale exceeds the threshold, by classifying the segment as voiced but otherwise classifying it as silence.

In still another of its aspects, this invention preferably provides a method for testing voice samples of persons for near-term suicidal risk where the method preferably includes the steps of initially setting an analysis window to a selected sample set length taken from a consecutive segment voice signal produced by the person where the particular sample is preferably identified for ordering purposes as the Kth sample. The method preferably proceeds with reading the Kth sample from the voice signal and computing wavelet transforms of the Kth sample for scales in powers of two running from the first to the $5^{th}$. The method then preferably proceeds with storing the signal energy value as computed for each scale, checking to determine whether the Kth sample is the last of the sample set and, if additional samples remain, repeating the steps of reading a sample, computing the wavelet transforms for the sample for scales in powers of two running from the $1^{st}$ to the $5^{th}$ and storing the signal energy value as computed for each such scale.

The method then proceeds preferably to set the median energy distribution for the scale for $2^4$ as a threshold and for each sample successively compares energy across the scales.

If maximum energy is at the first scale for $2^1$, the method preferably proceeds by identifying the segment as unvoiced and proceeds to the next succeeding sample. If segment maximum energy is at one of the scales of $2^2$ through $2^5$, the method preferably proceeds to identify the segment as being either voiced or silence. If the segment energy at the $2^4$ scale exceeds the threshold, the method classifies the segment as voiced but otherwise classifies the segment as silence.

The method preferably then proceeds to compute the wavelet transform for the sample set at scale $2^4$ with a scale factor defined by the quotient of the wavelet center frequency at level zero and the desired center frequency. The method then selects two consecutive segments of the vocal signal of such person identified as voiced segments and generates two separate pulse trains in which heights of the pulses correspond to amplitude of positive and negative peaks of the wavelet transformed speech signals. The method then preferably proceeds to threshold the segments of the vocal signal in order to discard peaks corresponding to possible unvoiced samples.

The method then preferably proceeds to compute a fundamental period of the entirety of each of the two segments by finding the location of the first peak of the autocorrelation of the smooth spectrum to the right of the zero lag component, detecting a starting pulse exhibiting the property of being larger than the pulse immediately preceding and immediately following such starting pulse and being greater than fifty percent (50%) of the global maximum of the pulse sequence, locating following prominent pulses as detected in the neighborhood of expected locations determined by the peak of the autocorrelation sequence, selecting between two sequences of positive and negative peaks a peak having the largest absolute magnitude and taking the difference between two consecutive prominent pulses as the duration for the glottal cycle.

The method in this aspect of the invention then concludes by determining period-to-period fluctuation in fundamental frequency as the inverse of the glottal cycle for the two consecutive prominent pulses.

In yet another of its aspects this invention provides apparatus for assessing near-term suicidal risk through voice analysis independently of verbal content of the voice where the apparatus includes means for time-wise dividing a vocal signal elicited from a person to be evaluated for near-term suicidal risk into segments according to whether the person was silent, speaking voiced words or making unintelligible unvoiced sounds and testing consecutive segments of the signal to categorize the segments as to voiced, unvoiced or silence, means for measuring fundamental frequency of two voice segments determined to have been consecutive; means for comparing the difference in measured fundamental frequency for the two voiced segments determined to have been consecutive and means for comparing the difference in measured fundamental frequency to fundamental frequency difference data for known near-term suicidal risk persons, known depressed persons not at near-term suicidal risk and non-depressed persons from a control group to determine whether the person is at near-term suicidal risk and, if so, providing a signal indicative of the same for action by a clinician.

In still another one of its aspects, this invention provides apparatus for categorizing voice samples of persons being tested for near-term suicidal risk as a prelude to such testing where the apparatus includes means for dividing the voice sample into a selected length of segments, means for reading individual sample segments, means for computing wavelet transforms of the read samples for a selected number of scales in powers of two, means for storing the determined computed energy value as computed by the wavelet transform for each scale, means for comparing the energy across the scale for each sample segment and means for identifying and discriminating among the segments according to the position of maximum energy across the scale for the segments to identify each segment as being voiced, unvoiced or silence.

In still another of its aspects, this invention provides apparatus for determining jitter as variations in fundamental frequency of the voice of a person being evaluated for near-term suicidal risk where the apparatus includes means for setting an analysis window to a selected sample set length and receiving a voice signal to be divided into such number of sets; means for computing a wavelet transform for each sample set along a scale where the scale factor defined by the quotient of the wavelet center frequency at level zero and a desired center frequency; means for selecting two consecutive segments of the vocal signal of such person which are voiced segments and generating two separate pulse trains in which heights of the pulses correspond to amplitude of the positive and negative peaks of the wavelet transform signal; means for thresholding the segments of the vocal signal and discarding peaks corresponding to possible unvoiced samples; means for computing a fundamental period for the entirety of each of the two segments by finding the location of the first peak of the autocorrelation of the smooth spectrum to the right of the zero lag component, detecting a starting pulse exhibiting a property of being larger than the pulse immediately preceding and immediately following such pulse and being greater than fifty percent (50%) of the global maximum of the pulse sequence, locating following prominent pulses as detected in the neighborhood of expected locations determined by the peak of the autocorrelation sequence, selecting between two sequences of positive and negative peaks the peak having the largest peak magnitude and taking the difference between two consecutive prominent pulses as the duration for the glottal cycle.

The apparatus further preferably includes means for determining period-to-period fluctuation in fundamental frequency as the inverse of the glottal cycle for the two consecutive prominent pulses which were selected and means for comparing the period-to-period fluctuation in fundamental frequency for the subject with variations in fundamental frequency for persons known not to be at near-term suicidal risk and providing a signal to a clinician in the event such comparison finds that the person is at near-term risk for suicide.

BRIEF DESCRIPTION OF THE FIGURES AND TABLES

Table 1 is a tabular compilation of estimated mean jitter values for each of the thirty subjects from whom experimental data were obtained.

Table 2 is a tabular collection of sensitivity, specificity, predictive value positive and predictive value negative values for pair wise maximum likelihood classification analysis of jitter for the thirty subjects from whom experimental data were obtained.

DETAILED DESCRIPTION OF THE PREFERRED EMBODIMENT AND BEST MODE KNOWN FOR PRACTICE OF THE INVENTION

This invention provides methods and apparatus for assessment of near-term suicidal risk. In one preferred practice, the method comprises several steps: Initially a patient's voice is sampled. In one preferred embodiment, such voice sampling is digital; in another embodiment the sampling is analog. As a source of data, a clinician may submit a sample tape from a client session for analysis. If the original voice sampling is from an analog recording, such recording is preferably then digitized. For example, one may digitize the recording using a analog to digital converter, such as a 16-bit A-D converter. A sampling rate of 10 KHz is suitably used, while other sampling rates also provide data of appropriate integrity for the acoustic analysis. Such converted digital signals are desirably edited using audio editing or studio software to remove lengthy pauses or periods of silence, so that a continuous or nearly continuous sample of speech is generated. One suitable software product for this use is Microsound Editor. Following conversion and editing out of undesirable pauses, analysis of the sampled voice data and determining whether data from patient's sampled voice meet specific criteria for suicidal predisposition proceed.

In practice, acoustic analyses of such digital or digitized voice recordings involves analyses such as fundamental frequency estimation. It is useful to classify the data into voiced, unvoiced and silence segments. Determination of glottal cycle duration is performed if at least one of two consecutive segments is classified as voiced. In a preferred practice measuring period-to-period fluctuation in fundamental frequency is performed. Jitter is a measure of period-to-period fluctuation in fundamental frequency. These measurements are useful for analysis respecting voice patterns present in databases of suicidal, depressed and nondepressed individuals.

In a preferred practice of the present invention, fundamental frequency analysis is performed by wavelet transform (WT).

The invention also enables assessment of suicidal risk where the determination step further comprises comparing the gathered and analyzed data to data from a database. In a preferred practice, the database includes sampled voice data from near-term suicidal, from depressed and from nondepressed patients. The database preferably incrementally grows as additional data are available and added to it. Accuracy and predictive value of the inventive method continually increase as the database grows.

The invention also provides for assessment of near-term suicidal risk assessment in a clinical environment. In one of these aspects the method comprises clinically evaluating a patient and determining that the patient may be depressed. A clinician then samples the patient's voice and acoustic analysis is performed to determine period-to-period fluctuation in the fundamental frequency (jitter) of the patient's sampled voice. Such analysis could be provided by an acoustical service bureau. In one aspect of the invention, an acoustical service laboratory is provided for at least one mental health crisis center. In another aspect of the invention, hardware and software allows analysis to be done in the clinician's office. In yet another practice analysis is performed by submitting sampled voice recording to an online data service having an updated and centralized database of voice patterns of interest. Period-to-period fluctuation in fundamental frequency data is used to compare the patient's voice analysis to a database of sampled voice data; the database comparison is used in conjunction with clinical assessment to determine whether the patient is at near-term risk for suicide.

Database Formulation

Jitter analysis was performed on audio recordings of ten near-term suicidal male patients, ten depressed male patients, and ten male non-depressed control subjects collected from existing databases. The audio recordings of suicidal patients were obtained from a subject speech database. A high near-term risk suicidal patient was defined as one who has committed suicide, has attempted suicide and failed or has a fixation on the thoughts and methods of suicide. Speech samples representing this class were extracted from therapy sessions between patients and psychiatrists and from recorded suicide notes. These speech samples represent high near-term risk suicidal behavior since the samples were obtained within days or several weeks of a patient's attempted suicide.

The audio recordings of the control group were extracted from the database of an ongoing study at Vanderbilt University. Control subjects were individuals screened and determined to be non-depressed after cognitive therapy or pharmacotherapy. The selected non-depressed control subjects met the following criteria: (1) a Hamilton rating scale (HRSD, 17 item version) for a depression score of 7 or less and (2) a Beck depression score of 7 or less.

Audio recordings of 10 depressed patients were selected from the Vanderbilt II Data Set, which is an existing tape library of speech collected from depressed subjects responding to advertisements for low-cost psychotherapy, and from a study comparing the effects of cognitive therapy and pharmacotherapy on depression. Details of these two collections of data are available in the respective publications "Effects of Training in Time-Limited Dynamic Psychotherapy: Mediators of Therapists' Responses to Training", by W. Henry, T. Schacht, H. Strupp, H. Butler, and J. Bender, appearing in *The Journal of Consulting Clinical PsychologyThe Journal of Consulting Clinical Psychology*, volume 61, number 3, pp. 441-447, 1993 and "Cognitive Therapy and Pharmacotherapy for Depression" by S. Hollon et al, *Archives of General Psychiatry*, volume 49, pp. 774-778, 1992.

At the time of the recordings, the patients in the Vanderbilt II Data Set were physically healthy and considered not in need of alternate psychological treatment such as drug therapy or hospitalization. Only those patients meeting DSM-IV criteria for major depressive disorder were included in the database. The patients taken from the second study met the following criteria: (1) having a major depressive disorder as defined by the research diagnostic criteria (RDC) in the paper by R. L. Spitzer, J. Endicott, and E. Robins entitled "Research Diagnostic Criteria: Rationale and Reliability", *Archives of General Psychiatry* volume 35, pp. 773-782, 1978, (2) a Beck depression score of 20 or greater and (3) a Hamilton rating scale (HRSD, 17-item version) depression score of 14 or greater.

All of the audio recordings were then digitized using a sixteen-bit analog to digital converter. The sampling rate was 10 KHz, with an anti-aliasing filter (5 KHz low-pass) precisely matched to the sampling rate. The digitized speech waveforms were then imported into the MicroSound Editor where silence pauses exceeding 0.5 seconds were removed to obtain a record of continuous speech. 30 seconds of continuous speech from each subject were stored for further analysis.

Wavelet-Based Jitter Determination Algorithm Development

A wavelet transform (WT) based glottal cycle duration is preferably used for fundamental frequency determination. This is motivated by the time-scale representation of the wavelet transform providing the ability to characterize local regularity of signals by decomposing them into elementary blocks that are well localized in both time and frequency. With this method, segment length is not a crucial factor for an accurate estimation of a wide range of fundamental frequencies. Moreover, wavelet transform is more dynamic than many other fundamental frequency estimation methods since it provides a value for each glottal cycle, rather than an average over a windowed segment, which yields more accurate jitter measurements. A technique for determining fundamental frequency using wavelet transform is disclosed by S. Kadambe and G. F. Boudreaux-Bartels, "Application of Wavelet Transform for Pitch Detection of Speech Signals", *IEEE Transactions on Information Theory*, volume 38, number 2, March 1992.

Fundamental Frequency Determination

Figure 1:
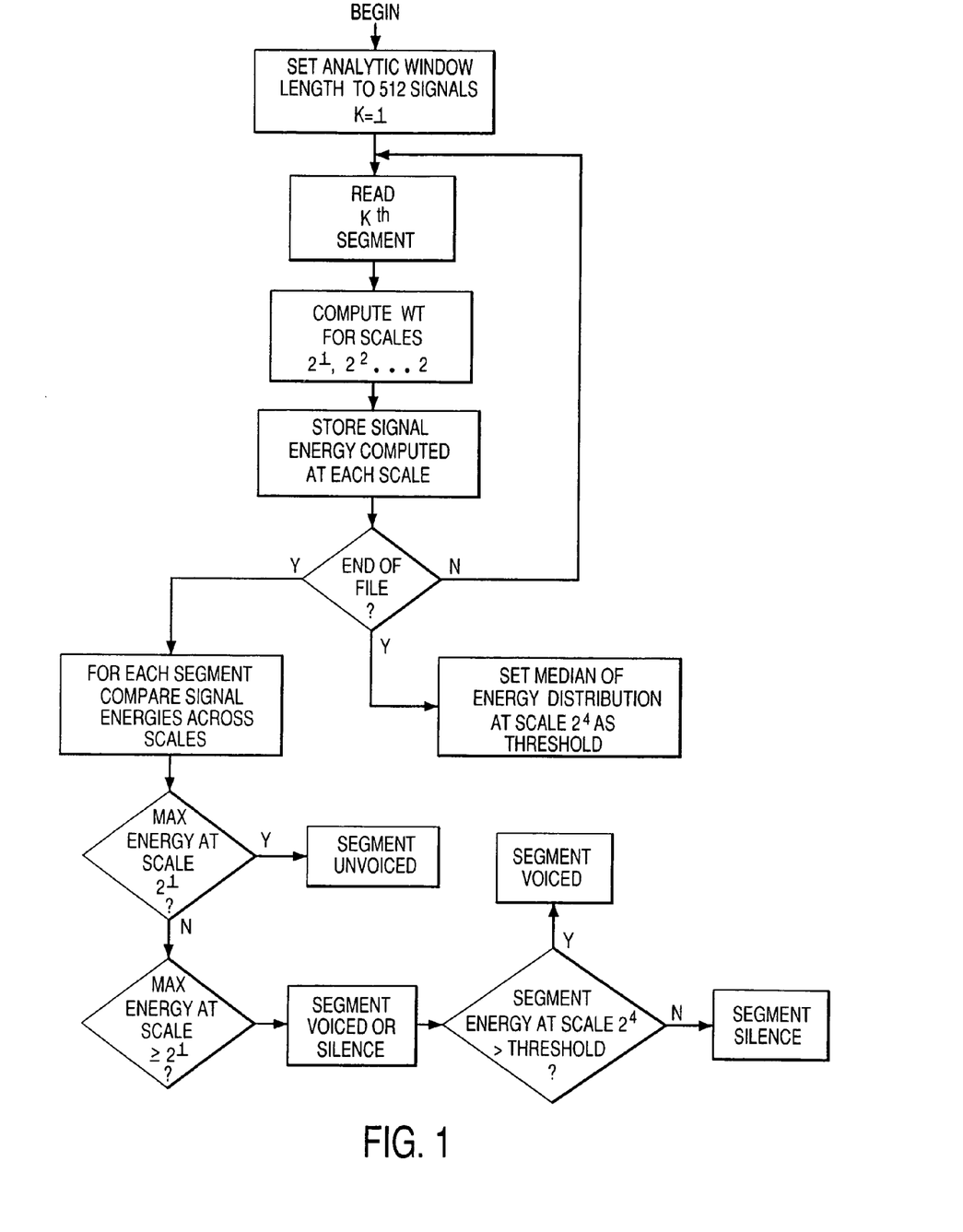
FIG. 1 is a schematic block diagram illustrating determination of voiced/unvoiced/silence segment determination in a vocal signal in accordance with the invention.

In the wavelet transform based fundamental frequency determination algorithm, speech signals are preferably first broken into 512 data point segments and the wavelet transform of each segment is preferably calculated for 5 consecutive levels (j=1, 2, ... 5). Next, a scale-energy based decision rule is preferably applied for voiced/unvoiced/silence classification. The voiced segments are further analyzed for determination of duration of each glottal cycle. FIG. 1 is a flow chart of the preferable voiced/unvoiced/silence classification method.

Voiced, Unvoiced, And Silence Classification

The algorithm for voiced, unvoiced and silence classification exploits the fact that unvoiced speech segments are noise-like and contain many high frequency components. On the other hand, voiced speech segments are quasi-periodic and low frequency in nature. The Dyadic Wavelet Transform (DWT) provides a localized frequency analysis of speech segments by increasing or decreasing the scale factor. Lower scales capture high frequency content while filtering out low frequency information. Higher scales are localized on low frequency bands. Therefore, for unvoiced speech segments, the DWT computed at scale $a=2^1$ has the largest energy compared to the energies computed at higher scales ($a=2^2 \ldots 2^5$). As a result, unvoiced speech segments can easily be detected by comparing energies of DWTs computed at scales $a=2^1$ through $a=2^5$. If the DWT at scale $a=2^1$ has the largest energy, the segment is classified as unvoiced. Otherwise, it can either be a voiced or silence segment depending on its energy at higher scales. Therefore, the set of unvoiced speech segments can be represented as follows:

$$a_k = \underset{2^1 \leq a \leq 2^4}{\arg\max}\, E_k^a \quad k = a, \ldots M$$

$$UV = \{k \mid a_k = 2^1\}$$

where E represents the energy of the $k^{th}$ segment at scale a, $a_k$ represents the scale at which segment k has maximum energy, M is the number of segments, and UV represents the set of indices of segments that are classified as unvoiced.

Where a segment is not classified as unvoiced, the algorithm proceeds further and decides if the underlying segment is voiced or silence. For this purpose, energy of the segment computed at scale $a=2^4$ is compared to a predetermined threshold. If it exceeds this threshold, it is classified as voiced. Otherwise, it is classified as silence. The threshold employed is preferably the median of the segment energy distribution over the voiced and silence speech segments computed at scale $a=2^4$. So, if $\{E_k\}_{k-1}$ represents the set of energies of voiced and silence segments computed at scale $a=2^4$, each of these groups can be represented as follows:

$$V = \left\{k \mid E_k^{2^4} > \mathrm{median}\left(\{E_k^{2^4}\}_{k-1}^N\right)\right\} \quad k \notin UV$$

$$S = \left\{k \mid E_k^{2^4} > \mathrm{median}\left(\{E_k^{2^4}\}_{k-1}^N\right)\right\} \quad k \notin UV$$

where N is the total number of voiced and silence segments, k is the segment index, V is the set of voiced indices, and S is the set of silence indices.

Glottal Cycle Duration Determination

Figure 2:
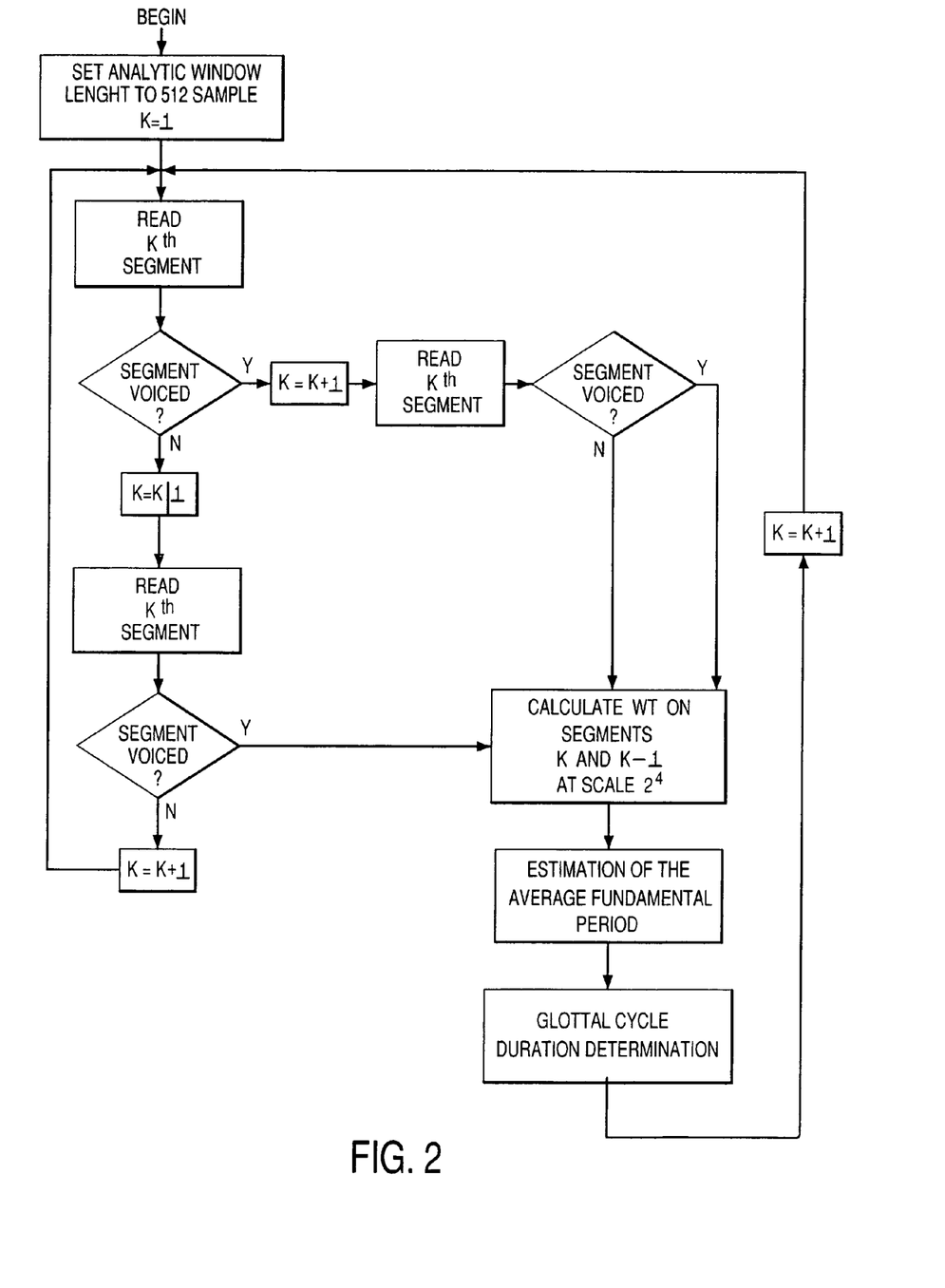
FIG. 2 is a schematic block diagram illustrating glottal cycle duration determination in accordance with the invention.

During the voiced, unvoiced, and silence classification analysis, if at least one of the two consecutive segments, $k^{th}$ and $k+1^{st}$ is declared voiced, the next step preferably determines the duration of each glottal cycle within these segments. Periodicity analysis of the wavelet transform of these segments computed at scale $a=2^4$ is preferably used for this purpose. Using WT at $4^{th}$ level focuses on the frequency interval where fundamental frequency occurs.

The speech signals are preferably sampled at 10 KHz. Accordingly, the quadratic splint wavelet used has a center frequency, $f_c$, of 5 KHz. and a bandwidth, B, of 10 KHz. With these specifications, the scab factor to localize the underlying wavelet into the frequency range of interest (30-600 Hz) is found using the following ratio:

$$a = \frac{f_{c_a}}{f_{c_d}}$$

Here $f_{c_a}$ represents wavelet center frequency at level 0 and $f_{c_d}$ is the desired center frequency. By setting $f_{c_a}$ to 5 KHz. and $f_{c_d}$ to 300 Hz and rounding off the result to the nearest power of two, the scale corresponds to $a=2^4$. Therefore, computing WI at only this scale eliminates or at least attenuates signal components having frequencies that are irrelevant to fundamental frequency determination. The wavelet transformed signal is reconstructed at $a=2^4$ so that sampling frequency is still 10 KHz.

Once WT at scale $a=2^4$ is computed, this smoothed signal is further analyzed for glottal cycle duration determination. To accomplish this, two separate pulse trains are generated with heights of the pulses corresponding to amplitude of positive peaks and negative peaks (the local extrema) of the transformed speech signal. Although only voiced segments are preferably employed for periodicity analysis, unvoiced speech samples could still exist at the beginning or at the end of each voiced segment. Therefore, both of these pulse trains are thresholded to discard peaks corresponding to possible unvoiced samples. Only peaks exceeding 30% (which is the empirically found threshold value) of the global maximum within the segment are retained for further analysis.

Duration of each glottal cycle is then determined from these threshold pulse sequences.

As a first step in this determination, fundamental period over the whole segment is computed.

Autocorrelation of the smoothed spectrum of the speech signal at scale $a=2^4$ is preferably employed for this purpose. For each segment, fundamental period is determined by finding location of the first peak of the autocorrelation sequence to the right of the zero lag component. The next step is to locate only the prominent pulses from the pulse sequences generated above. A starting pulse is initially detected; this is the pulse exhibiting the property of being larger than both the immediately proceeding pulse and the pulse immediately following it. The starting pulse also is required to be greater than 50% of the global maximum of the pulse sequence. Taking the location of this "starting" pulse as a starting point, locations of succeeding prominent pulses are then detected in the neighborhood of their expected locations as determined by the peak of the autocorrelation sequence. Between the two estimated sequences of prominent peaks (namely the positive peaks and the negative peaks), the peak having the largest absolute magnitude is selected. Finally, the difference between two such consecutive prominent pulses is determined as the duration for that glottal cycle, which is the reciprocal of fundamental frequency. FIG. 2 presents a flow chart for this aspect of the invention.

Jitter Analysis

Once fundamental frequency contours were determined for 30-second continuous speech segments of each group of subjects, period-to-period fluctuation of the fundamental frequency is determined. For N consecutive fundamental periods, jitter is computed based on the following formula:

$$JF\% = \frac{\frac{1}{N-1}\sum_{i=1}^{N-1}|F_1 - F_{N-1}|}{\frac{1}{N}\sum_{i=1}^{N}F_1}$$

This captures short-term perturbation of a subject's fundamental frequency.

Experimental Results

Figure 3:
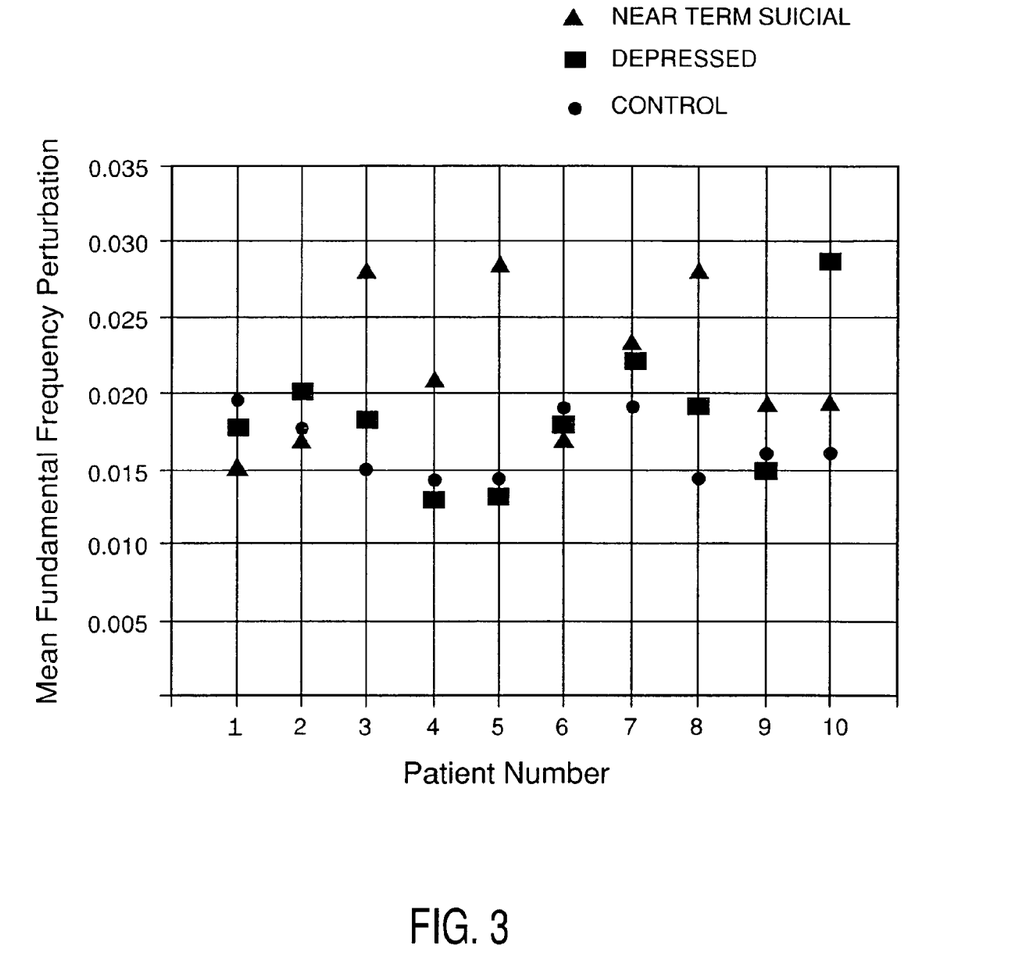
FIG. 3 is a plot of determined mean fundamental frequency distribution values for each of the thirty subjects from whom experimental data were obtained.

Mean fundamental frequency perturbation values determined for each subject are given in Table 1. These values are also illustrated in the scatter diagram of FIG. 3. These numbers characterize short-term fundamental frequency fluctuation characteristics of the speech of subjects in each class. The increased short-term fundamental frequency fluctuation in speech of suicidal subjects is apparent. Suicidal subjects P3, P4, P5 and P8 are the most separated from control and depressed subjects. Upon investigating the recording dates with respect to the suicide attempt dates of the underlying subjects, subjects P3, P4 and P8 speech recordings were collected within days before their actual attempts. Speech samples for subject P5 were extracted from a Roche educational tape, recorded to demonstrate an example of a near-term suicidal patient's speech. The significantly higher jitter values associated with the imminence of suicidal behavior demonstrates that vocal jitter is a good indicator of imminent suicidal risk.

Two-sample statistical analyses were performed on these jitter values to determine statistical significance of the identified patterns. These statistical analyses included Wilcoxon's sum of ranks test to compare the class jitter distributions, the F-test to compare the variances or class jitter measurements, the T-test for comparison of class means and application of a maximum likelihood classifier using the holdout method.

TABLE 1

Estimated Mean Jitter Values for Each of the 30 Subjects.

| Subject | Control Group | Depressed Group | Near-term Suicidal Group |
|---|---|---|---|
| P1 | 0.0196 | 0.0178 | 0.0152 |
| P2 | 0.0178 | 0.0201 | 0.0216 |
| P3 | 0.0152 | 0.0183 | 0.0282 |
| P4 | 0.0140 | 0.0128 | 0.0209 |
| P5 | 0.0144 | 0.0134 | 0.0285 |
| P6 | 0.0185 | 0.0184 | 0.0166 |
| P7 | 0.0188 | 0.0228 | 0.0229 |
| P8 | 0.0148 | 0.0190 | 0.0280 |
| P9 | 0.0162 | 0.0151 | 0.0194 |
| P10 | 0.0162 | 0.0287 | 0.0198 |
| Mean | 0.0165 | 0.0187 | 0.0217 |

Two-sample comparisons between the class distributions using Wilcoxon's sum of ranks procedure yielded significant differences between non-depressed and suicidal class distributions ($p<0.01$). There were no significant differences between depressed suicidal, depressed non-suicidal and non-depressed class distributions. Comparison of class variances using the F-test yielded significant differences between control and suicidal, and control and depressed class variances ($p<0.01$) but no significant differences were found between depressed and suicidal class variances. Class means were compared via the two-sample T-test which yielded significant differences between control subjects and suicidal subjects (p<0.01). However, class means were not found to be a significant discriminator among control subjects, depressed subjects and suicidal subjects. The differences between the distributions of the classes can be seen from the box plots in FIG. 4.

Figure 4:
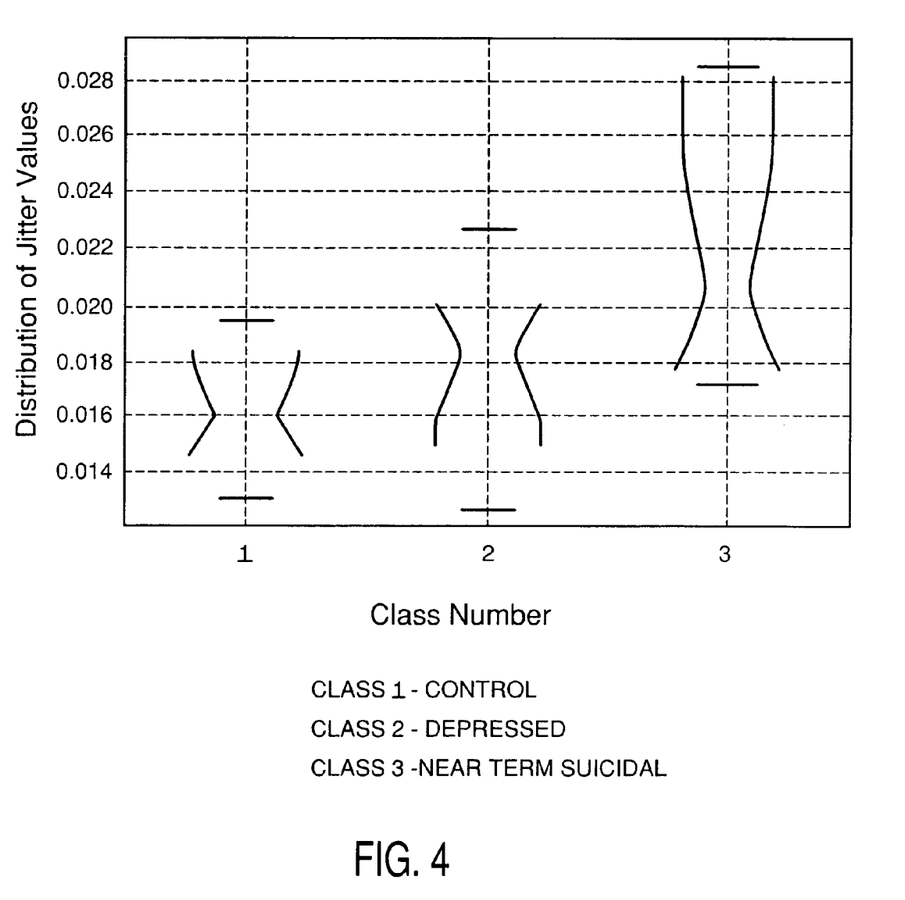
FIG. 4 is a distribution plot of jitter values for three classes of the thirty subjects from whom experimental data were obtained.

Lower and upper lines of the boxes FIG. 4 represent the $25^{th}$ and $75^{th}$ percentiles of the samples. Lines in the middle of the boxes are sample medians. Lines extending above and below the boxes show the extent of the rest of the samples in each group except for outliners. The plus sign at the top of the depressed class distribution is an indication of an outliner in this class sample.

Mean jitter measurement as a discriminator among non-depressed, depressed and suicidal groups was evaluated through a maximum likelihood (ML) classifier. Means and the variances of feature values were used to generate Gaussian probability density functions (PDF) for each group data. Next, a ML classifier was developed employing the PDFs of each class to make a decision as to which class PDF results in the closest match for an input data sample. The PDFs of the class distributions were assumed to be unimodal Gaussian and were generated by using the ML estimates of the means and variances.

For a set of T training samples $X_{training} = \{x_1, x_2, \ldots x_1\}$ and assuming independence between these samples, the unimodal Gaussian likelihood can be written as:

$$p(X_{training} | \lambda) = \prod_{f=1}^{\gamma} p(x_1 | \lambda)$$

Bayes' decision rule was then employed to perform identification on the test samples based on the trained model. A test subject is classified in a group for which it has the maximum a posteriori probability for a given observation $X_{test}$. Formally, $$G = \arg\max_{1<k<N} Pr(\lambda_k | X_{test}) = \arg\max_{1<k<N} \frac{P(X_{test} | \lambda) Pr(\lambda_k)}{P(X_{test})}$$

where the parameters $\lambda_k$, N and $X_{test}$ are the model parameters associated with class k, number of classes and the test sample, respectively. In this embodiment of the invention N=2.

Assuming equally likely a priori probabilities ($P(\lambda_k)=\frac{1}{2}$) and noting that $P(X_{test})$ is the same for both of the models, the classification rule simplifies to $$G = \arg\max_{1<k<N} Pr(\lambda_k | X_{test})$$

For analytical purposes, it is usually easier to work with the logarithm of the likelihood than with the likelihood itself. Since the logarithm is monotonically increasing, $X_{test}$ that maximizes the likelihood function also maximizes the log likelihood. Using logarithms and independence between observations, the identification system computes $$G = \arg\max_{1<k<N} \sum_{f=1}^{\gamma} \log P(x_1 \lambda_k)$$

Then, the patient is assigned to the class that gives the largest log likelihood value.

The total data set is split into a training set and a test set. The training set is used to construct the classification function and the test set is used to evaluate it. Due to the limited number of patients in this case, Lachenbruch's holdout procedure, as set forth in *Applied Multivariate Statistical Analysis* by Johnson and Wichern, Prentice Hall, 1992, is desirably employed. The holdout procedure removes one sample from the composite data set and constructs the classification function on the remaining samples. The classifier is then tested using the leftover sample. Afterwards, this sample is put back into the pool and a new sample is selected to start the process again. This procedure is repeated until all samples have been used in classifier design and evaluation.

By employing this holdout ML classification scheme, mean jitter values extracted from each subject yielded an 80% correct classification between suicidal and non-depressed groups. Among ten suicidal subjects, seven were correctly classified to be suicidal while nine of the ten control subjects were correctly classified to be control. These classification results are presented in Table 2.

TABLE 2

ML Classification Results for Jitter.
Sensitivity, specificity, predictive value positive (PV+) and predictive value negative (PV−) values for pairwise classification analysis.

| Classes | Sensitivity | Specificity | PV | PV |
|---|---|---|---|---|
| Control/Depressed | 0.70 | 0.6 | 6.63 | 0.66 |
| Depressed/Suicidal | 0.50 | 0.70 | 0.62 | 0.58 |
| Control/Suicidal | 0.70 | 0.0 | 0.87 | 0.75 |

The results set forth above in accordance with the practice of the invention verify that short-term perturbations of fundamental frequency are higher for depressed and near-term suicidal speech. Two-sample statistical analyses yield statistically significant differences between class distributions, means and variances of jitter measurements taken from near-term suicidal and control subjects' speech. Depressed and control subjects, however, are statistically different based on class variances. In accordance with the invention these results confirm that fundamental frequencies in depressed and near-term suicidal subjects' speech are more erratic than the fundamental, frequencies in control subjects' speech. Moreover, fluctuation of fundamental frequency is most pronounced for patients at most imminent suicidal risk (timing between recording of speech sample and suicide attempt was shortest.)

Jitter as a strong indicator of near-term suicidal behavior is understandable in view of the physiological nature of phonation. Phonation is the aerodynamic and acoustic production of an extremely complex vibratory system, namely the larynx and throat to name only two components of the vibratory system. Cycle-to-cycle fluctuations in fundamental frequency are inevitable even in normal speech. These variations can be altered by the speech production mechanism in some psychopathological conditions due to the sensitivity of the phonatory system to emotional stress. Several physiologic, specifically neuromuscular and cardiovascular, mechanisms are recognized to be major contributors to short term fundamental frequency variability; see "Vocal Jitter at Different Fundamental Frequencies: A Cardiovascular-Neuromuscular Explanation", R. F. Orlikoff, *Journal of Voice*, vol. 3, no. 2, pp. 104-112, 1989. These mechanisms include systematic variation of fundamental frequency over the heart cycle and inherent muscle noise associated with imperfect integration of individual motor unit contributions to sustained contraction of laryngeal musculature.

Specific motor commands that produce appropriate phonatary and articulatory movements for a desired sequence of speech sounds including intentionally produced prosodic features are mostly controlled by neocortex. The effects of emotional arousal, on the other hand, are primarily controlled by the limbic system by which the mechanisms of speech production can be influenced when driven by emotional arousal even against a person's will. The effects of emotional arousal on vocalization are generally produced via tonic activation of the somatic nervous system, i.e. striated musculature, and sympathetic as well as parasympathetic activation of the autonomic nervous system. Such changes in the activation of the sympathetic and parasympathetic branches of the autonomic nervous system cause variations in heart rate, blood pressure and muscular contraction, which in turn alter functioning of the phonatory system.

Effects of heart rate and blood pressure on cycle-to-cycle variations in fundamental frequency result from the influence of the cardiovascular system on phonation, mainly due to the great number of arteries found in the vocal folds. Even in normal speech production, during systole (when the heart is ejecting blood), the cardiovascular system serves primarily to swell the muscular body of the vocal folds, in turn narrowing the glottis, decreasing glottal closure time and thus elevating fundamental frequency. This causes the underlying period-to-period fluctuation in fundamental frequency during normal speech. Due to influence of the sympathetic and parasympathetic activation effect of the autonomic nervous system on heart rate and blood pressure, this fluctuation in fundamental frequency can deviate from normal depending on psychopathology. Variation in heart rate alters duration of the systolic and causes a speaker's vibratory cycles to be more erratic, providing an explanation for higher vocal jitter observed in near-term suicidal patients.

The effects of the motor system and muscle contraction on cycle-to-cycle variations in fundamental frequency result from the influence of the neuromuscular system on phonation. A "motor unit" consists of an individual motor neuron (sometimes called a "motor nerve fiber") and those relatively few muscle fibers that it innervates. Force of a muscle contraction and amount of isometric tension developed is controlled most effectively by varying the number of motor units activated, whereas varying the firing rates of these motor units provides a more sensitive mechanism.

A single motor neuron impulse causes a single short-lived twitch of its associated motor unit muscle. An individual striated muscle is organized into small fiber bundles, each containing muscle fibers from several motor units. For certain intrinsic laryngeal muscles, the number of muscle fibers per motor unit may be as few as 30 or as many as 166, either of which is very small compared with almost 2000 in many large limb muscles. This small innervation ratio (number of muscle fibers per motor unit) of the intrinsic laryngeal musculature allows fine control of the generated muscle tension which is a prerequisite for the speech functions of the laryngeal mechanism. Because of this physiological structure, much of the measured vocal fundamental frequency perturbation even in a normal voice can be traced to a single motor unit twitching within the intrinsic laryngeal musculature, serving to produce noisy variations in vocal fold tension.

Since the somatic nervous system is directly involved in motor expression, the number of motor units activated can be altered by psychopathology. Since striated laryngeal musculature is responsible for producing vocalization, alteration in the number of motor units activated alters muscle tone in the vocal folds, in turn influencing the cycle-to-cycle variation of the glottal cycle. With both motor retarded depressed patients and motor retarded suicidal patients exhibiting slowed responses, monotonic phrases, and poor articulation typically associated with slower motor action, lower F0s and higher jitter values in accordance with the invention may be expected in a high near-term suicidal depressed person's speech.

It is known that jitter varies most according to firing rate of motor units in the thyroarytenoid muscle; see "A Model for Neurologic Sources of Aperiodicity in Vocal Fold Vibration", by I. R. Titze, *Journal of Speech Hearing Research*, volume 35, pages 460-472, 1991. Higher motor-unit firing rates are associated with higher F0s and lower jitter.

The jitter findings in accordance with the invention represent a further advance over the knowledge that jitter is closely related to mean firing rate of motor units. Low jitter for control subjects and high jitter for suicidal subjects in accordance with the invention is consistent with manifestations of psychomotor retardation in speech. The retarded motor act, which is expected to lower motor-unit firing rates, causes lower F0s and higher amounts of jitter.

Depressed patients on the other hand exhibit a mixed scenario. Although on average their jitter values were higher than the control subjects, the depressed patients did not exhibit statistically significant differences when compared to the control and the suicidal groups. This is believed due to the heterogeneity of patients in the depressed group population, which might have included both retarded and agitated subgroups.

The invention and the experimental data set forth above are consistent with physiological phenomena behind cycle-to-cycle fluctuations in fundamental frequency and are consistent with the effects of neuromuscular and cardiovascular systems on the coordination of the muscles involved in phonation. The invention and the experimental data set forth above are consistent with and represent an extension of the phenomenon previously observed by Cummings, which found irregularity in the duration and shape of the glottal pulses occurring with increased emotional stress.

It is important to note that it is not possible to collect speech samples in a systematic manner from suicidal persons shortly before their suicide attempts. This is due to the inability to collect suicidal speech samples in controlled settings. As a result, the suicidal speech samples used to produce the data presented above were extracted from actual speech encountered in real-life situations.

Fundamental frequency perturbation measurements taken from depressed subjects and from high near-term suicidal risk subjects were found to be more erratic than that taken from non-depressed subjects, where high near-tern suicidal risk subjects exhibited statistically significant differences.

What is claimed is:

1. A method for using jitter variations in fundamental frequency of the voice of a person being evaluated for near-term suicidal risk, in determining such person to be at near-term risk for suicide based on measured difference between fundamental frequencies of two consecutive speech segments for such person as compared to speech fundamental frequency variations for persons known not to be at near-term suicidal risk comprising the steps of:

A. setting an analysis window to a selected sample set length in excess of 3 where the particular sample is identified as the Kth sample;
B. computing the wavelet transform for the sample set at scale 2 to the 4th power, with a scale factor defined by the quotient of the wavelet center frequency at level 0 and the desired center frequency;
C. selecting two consecutive segments of the vocal signal of such person which are voiced segments and generating separate pulse trains in which the heights of the pulses correspond to amplitude of positive and negative peaks of the wavelet transformed speech signal;
D. thresholding the segments of the vocal signal to discard peaks corresponding to possible unvoiced samples;
E. computing a fundamental period over the entirety of each of the two segments by:
   i. finding the location of the first peak of the autocorrelation of the smoothed spectrum to the right of the zero lag component;
   ii. detecting a starting pulse exhibiting the property of being larger than both the pulse immediately preceding and immediately following such pulse and being greater than 50% of the global maximum of the pulse sequence;
   iii. locating following prominent pulses as detected in the neighborhood of expected locations determined by the peak of the autocorrelation sequence;
   iv. selecting, between two sequences of positive and negative peaks, the peak having the largest magnitude; and
   v. taking the difference between two consecutive prominent pulses as the duration for the glottal cycle; and
F. determining period-to-period fluctuation of fundamental frequency by measuring the difference between fundamental frequencies of two consecutive segments; and
G. comparing the measured difference between fundamental frequencies of two consecutive segments for such person to variations in fundamental frequency for persons known not to be at near-term suicidal risk and providing a signal to a clinician in the event such comparison finds the person to be at near-term risk for suicide.

2. A method for jitter testing voice samples of a person for indication of high near-term suicidal risk, comprising the steps of:

A. setting an analysis window to a selected sample set length of a pre-selected number of consecutive segment voice signals from the person, where the particular sample is identified as the Kth sample;
B. reading the Kth sample;
C. computing wavelet transforms of such Kth sample for scales in powers of 2 running from the 1st power to the 5th;
D. storing the signal energy value as computed for each scale;
E. checking to determine whether the Kth sample is the last of the sample set and if additional samples remain, repeating steps "b" through "d";
F. setting the median energy distribution for the scale at 2 to the 4th power as a threshold;
G. successively for each sample comparing the energy across the scales;
H. if the maximum energy is at the scale for 2 to the 1st power, identifying the segment as unvoiced and proceeding to the next succeeding sample;
I. if the segment maximum energy is at one of the scales 2 to the 2nd power through 2 to the 5th power, identifying the segment as being either voiced or silence;
J. if the segment energy at the 2 to the 4th power scale exceeds the threshold, classifying the segment as voiced; otherwise classifying it as silence;
K. computing the wavelet transform for the sample set at scale 2 to the 4th power, with a scale factor defined by the quotient of the wavelet center frequency at level 0 and the desired center frequency;
L. selecting two consecutive segments of said vocal signal of such person which have been identified as voiced segments and generating two separate pulse trains in which heights of pulses correspond to amplitude of positive and negative peaks of the wavelet transformed speech signal;
M. thresholding the segments of the vocal signal to discard peaks corresponding to possible unvoiced samples;
N. computing a fundamental frequency over the entirety of each of the two segments by
   i. finding the location of the first peak of the autocorrelation of the smoothed spectrum to the right of the zero lag component;
   ii. detecting a starting pulse exhibiting the property of being larger than the pulse immediately preceding and immediately following such pulse and being greater than 50% of the global maximum of the pulse sequence;
   iii. locating following prominent pulses as detected in the neighborhood of expected locations determined by the peak of the autocorrelation sequence;
   iv. selecting between two sequences of positive and negative pulse peaks the peak having the largest magnitude; and
   v. taking the difference between two consecutive prominent pulses as the duration for the glottal cycle; and
O. determining period-to-period fluctuation of fundamental frequency by measuring the difference between fundamental frequencies of two consecutive segments
P. comparing the measured difference between fundamental frequencies of two consecutive segments for such person to variations in fundamental frequency for persons known not to be at near-term suicidal risk and providing a signal to a clinician in the event such comparison finds the person to be at near-term risk for suicide.

3. Apparatus for evaluating whether a person is at high near term risk of suicide by determining jitter variations in fundamental frequency of the voice of such a person being evaluated for near-term suicidal risk, comprising:

A. counter means for setting an analysis window to a selected sample set length where the particular sample is identified as the Kth sample and computing the wavelet transform for the sample set at scale 2 to the 4th power, with a scale factor defined by the quotient of the wavelet center frequency at level 0 and the desired center frequency;
B. means for selecting consecutive segments of the vocal signal of such person which are voiced segments and generating separate pulse trains in which the heights of the pulses correspond to the amplitude of positive and negative peaks of the wavelet transformed speech signal, thresholding the segments of the vocal signal to discard peaks corresponding to possible unvoiced samples and computing a fundamental period over the entirety of each of the segments by:
  i. finding the location of the first peak of the autocorrelation of the smoothed spectrum to the right of the zero lag component;
  ii. detecting a starting pulse exhibiting the property of being larger than the pulse immediately preceding and immediately following such pulse and being greater than 50% of the global maximum of the pulse sequence;
  iii. locating following prominent pulses as detected in the neighborhood of expected locations determined by the peak of the autocorrelation sequence;
  iv. selecting, between two sequences of positive and negative peaks, the peak having the largest absolute magnitude; and
  v. taking the difference between two consecutive prominent pulses as the duration for the glottal cycle; and
C. means for determining period-to-period fluctuation of fundamental frequency by measuring the difference between fundamental frequencies of consecutive segments, comparing said fundamental frequency fluctuation for such person to that of persons known to be not at near term risk for suicide and providing a clinician with a visual and/or audible signal indicating the results of such comparison.

4. Apparatus for testing voice samples of persons for near-term suicidal risk and providing an alarm signal upon a subject being found to represent a near-term suicidal risk, comprising:
  A. counter means for setting an analysis window to a preselected sample set length of consecutive segment voice signals from the person, where the particular sample is identified as the Kth sample, and reading the Kth sample of said person's vocal signal;
  B. mathematical processor means for computing wavelet transforms of such Kth sample for scales in powers of 2 running from the 1st power to the 5th and storing the signal energy value as computed for each scale while checking to determine whether the Kth sample is the last of the sample set and if additional samples remain, repeating the wavelet transformation;
  C. storage means for setting and storing median energy distribution at the scale for 2 to the 4th power as a threshold;
  D. comparator means for successively comparing, for each sample, energy across the scales and testing to determine if the maximum energy is at the scale for 2 to the 1st power and identifying the segment as unvoiced and proceeding to the next succeeding sample but if the segment maximum energy is at one of the scales 2 to the 2nd power through 2 to the 5th power, identifying the segment as being either voiced or silence and further comparing segment energy at the 2 to the 4th power scale for exceeding the threshold and identifying the segment as voiced; otherwise identifying it as silence;
  E. means for computing the wavelet transform for the sample set at scale 2 to the 4th power, with a scale factor defined by the quotient of the wavelet center frequency at level 0 and the desired center frequency and selecting two consecutive segments of said vocal signal of such person identified as voiced segments and generating separate pulse trains in which heights of pulses correspond to amplitude of positive and negative peaks of the wavelet transformed speech signal;
  F. peak detector means for thresholding the segments of the vocal signal and discarding peaks corresponding to possible unvoiced samples;
  G. processor means for computing fundamental period over the entirety of each of the two segments by:
    i. finding the location of the first peak of the autocorrelation of the smoothed spectrum to the right of the zero lag component;
    ii. detecting a starting pulse exhibiting the property of being larger than the pulse immediately preceding and immediately following such pulse and being greater than 50% of the global maximum of the pulse sequence;
    iii. locating following prominent pulses as detected in the neighborhood of expected locations determined by the peak of the autocorrelation sequence;
    iv. selecting between two sequences of positive and negative peaks the peak having the largest peak magnitude; and
  H. means for taking the difference between two consecutive prominent pulses as the duration for the glottal cycle and determining period-to-period fluctuation of fundamental frequency by measuring the difference between fundamental frequencies;
  I. comparing the measured difference between fundamental frequencies of two consecutive segments for such person to variations in fundamental frequency for persons known not to be at near-term suicidal risk and providing a signal to a clinician in the event such comparison finds the person to be at near-term risk for suicide.

5. A method using jitter variations in the voice of a person for determining such person to be at near-term risk for suicide based on measured difference between fundamental frequencies of two consecutive speech segments for such person as compared to speech fundamental frequency variations for persons known not to be at near-term suicidal risk comprising the steps of:
  A. computing the wavelet transform for a selected sample set of the person's speech taken while the person speaks;
  B. selecting successive segments of the vocal signal of such person and generating pulse trains in which heights of the pulses correspond to amplitude of positive and negative peaks of the wavelet transformed speech signal;
  C. thresholding the segments of the speech signal to discard peaks corresponding to possible unvoiced samples;
  D. computing a fundamental period over the entirety of each of the two segments by:
    i) finding the location of the first peak of the autocorrelation of the smoothed spectrum to the right of the zero lag component;
    ii) detecting a starting pulse exhibiting the property of being larger than both the pulse immediately preceding and immediately following such pulse and being greater than 50% of the global maximum of the pulse sequence;
    iii) locating following prominent pulses as detected in the neighborhood of expected locations determined by the peak of the autocorrelation sequence;
    iv) selecting, between two sequences of positive and negative peaks, the peak having the largest magnitude; and
    v) taking the difference between two consecutive prominent pulses as the duration for the glottal cycle; and
  E. determining period-to-period fluctuation of fundamental frequency by measuring the difference between fundamental frequencies of successive segments; and F. comparing the measured difference between fundamental frequencies of successive segments for such person to variations in fundamental frequency for persons known not to be at near-term suicidal risk and, in the event such comparison finds the person to be at near-term risk for suicide, so-identifying such person.

\* \* \* \* \*